UNITED STATES PATENT OFFICE.

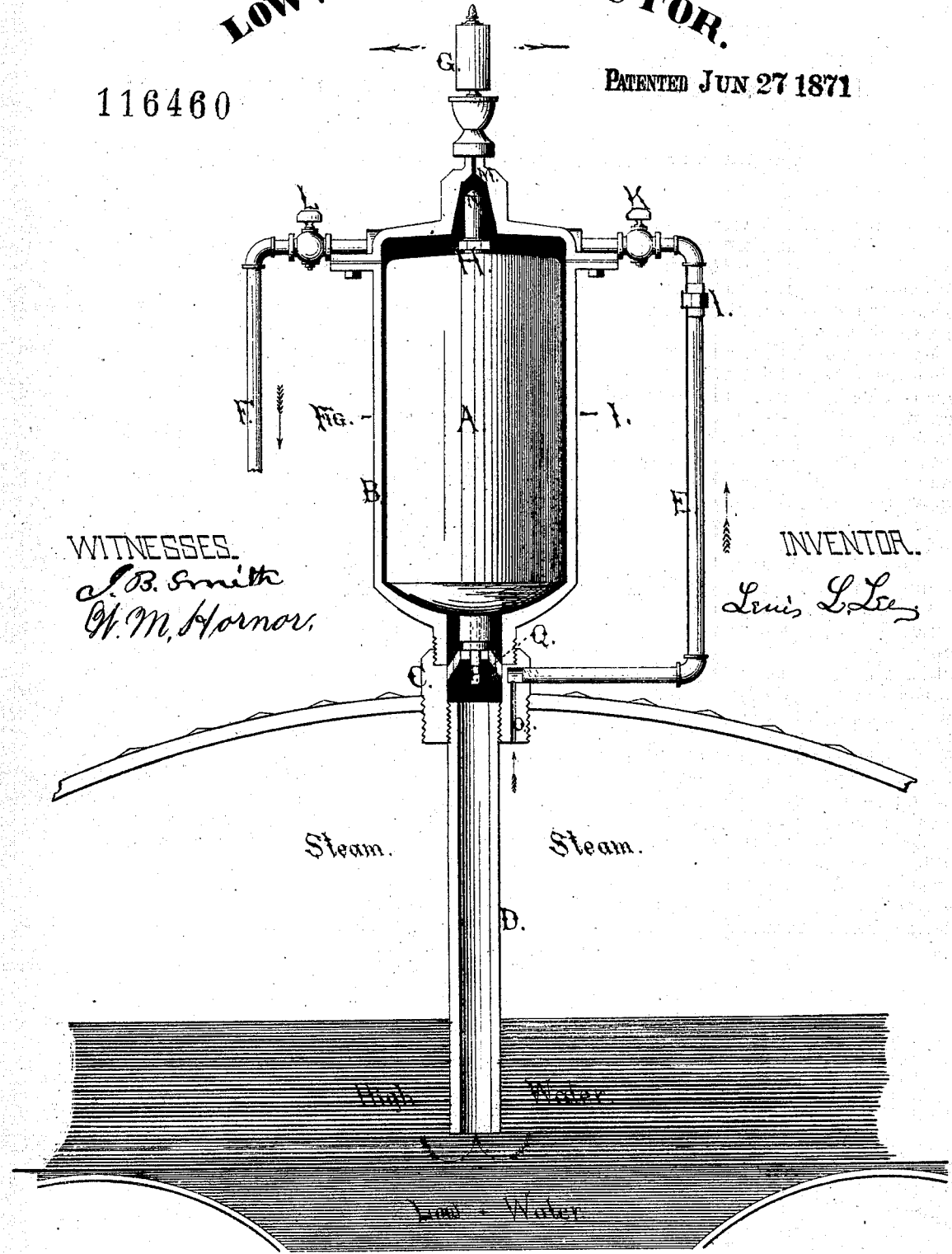

LEWIS L. LEE, OF MILWAUKEE, WISCONSIN.

IMPROVEMENT IN LOW-WATER DETECTERS.

Specification forming part of Letters Patent No. 116,460, dated June 27, 1871.

*To all whom it may concern:*

Be it known that I, LEWIS L. LEE, of Milwaukee, in the county of Milwaukee, in the State of Wisconsin, have invented certain Improvements in Low-Water Detecters, of which the following is a specification:

My invention is for the purpose of detecting when the water is too low in a steam-boiler; and this is done by a float which is raised by the water, and a valve on the top of the float, which closes an opening for the steam to pass out of; and, when the water falls below the end of a pipe running from the top of the boiler down into the water, the float will fall, open the orifice for the steam to rush out through, and blow a whistle and give the alarm.

Figure 1 is a sectional view of the detecter standing on a section of a boiler.

A is the float inside of a case, B, screwed into a nut, C, which is screwed into a boiler with a pipe, D, screwed into nut C, and passing down into the water in the boiler, thus forming a communication from the water in the boiler to the case B; E, a pipe from the nut C to the top of case B; F, an outlet-pipe from the top of case B; G, a whistle on top of case B; H, square projection on valve N to unscrew and take out the valve from float A for the purpose of putting in shot to balance the float and give it just weight enough so that it will fall and open the steam orifice when the water is out of case B and to screw the valve in again; I, union in pipe E; K, stop-cock in pipe E; L, stop-cock in pipe F; M, steam-orifice from case B to whistle G and the valve-seat; N, valve on the top of float A; O, opening in nut C to let the steam pass into pipe E; P, stem on the bottom of float A passing through guide Q to keep the float A steady. This guide Q has openings on its sides to allow the water to pass through to operate the float.

The operation of this detecter is that, when the water in the boiler is above the lower end of pipe C, the water is forced up into case A and the float rises and closes the steam-orifice M with the valve N; and when the water falls below the end of pipe D, the water will run out of case B, the float will fall, and the steam will rush out through orifice M and sound the whistle G.

To clean out the detecter, open stop-cock L, and the steam and water will blow all the mud and dirt from around the float and from the inside of case B, and out through pipe F. And to clean the top of float A and case B, turn cocks K and L, and the dirt will be blown out in same manner through pipe F. And to test the machine to see if it is in order, turn cock K while cock L is closed, and the steam will pass up through pipe E and out through the whistle and blow it, the float A falling down to the bottom of case B.

I claim as my invention—

The nut C, connected with pipe D and case B, and containing the opening O for the test-pipe E, substantially as set forth.

L. L. LEE.

Witnesses:
   J. B. SMITH,
   W. M. HORNOR.